United States Patent [19]

Jessup et al.

[11] 3,776,578

[45] Dec. 4, 1973

[54] HIGH PRESSURE ROTATABLE PIPE CONNECTION

[75] Inventors: Robert L. Jessup; David L. Farley, both of Duncan, Okla.

[73] Assignee: Halliburton Company, Duncan, Okla.

[22] Filed: Mar. 21, 1972

[21] Appl. No.: 236,624

[52] U.S. Cl.............. 285/94, 285/98, 285/281, 285/DIG. 1, 285/181
[51] Int. Cl................................................ F16l 7/00
[58] Field of Search.................. 285/95, 98, DIG. 1, 285/181, 281, 94

[56] References Cited
UNITED STATES PATENTS

| | | |
|---|---|---|
| 2,421,691 | 6/1947 | Gibson et al........................ 285/101 |
| 943,904 | 12/1909 | Struer ................................ 285/94 R |
| 2,331,615 | 10/1943 | Meyer............................. 285/DIG. 1 |
| 2,532,669 | 12/1950 | Jones.............................. 285/DIG. 1 |
| 2,770,475 | 11/1956 | Rafferty.............................. 285/94 |
| 2,818,285 | 12/1957 | Greiner.......................... 285/DIG. 1 |

*Primary Examiner*—Dave W. Arola
*Attorney*—John H. Tregoning et al.

[57] ABSTRACT

A rotatable pipe connection for rotatably joining two pipe sections for high pressure fluid flow has a pressure balancing internal annular ring open to the flow passage in the connection, and bearings, packing, and seals to provide longitudinal and transverse support and seal against pressure loss.

19 Claims, 7 Drawing Figures

PATENTED DEC 4 1973 3,776,578

HIGH PRESSURE ROTATABLE PIPE CONNECTION

BACKGROUND OF THE INVENTION

Generally this invention relates to pipe connections which allow the joined ends of pipes to rotate with respect to one another while high pressure abrasive or caustic fluid flows through the pipes under high pressures, and specifically involves devices which allow the pipes to rotate with respect to one another with a minimum of friction even though high fluid pressures and transverse loads on the pipes would normally tend to introduce high friction forces in the pipe connection.

In large industrial operations and particularly in the oil industry, it is often desirable and even imperative that high pressure fluids be pumped continuously through flexible hose systems and into the operational area. In an oil field operation such as high-pressure drilling, a high pressure fluid is supplied to the drilling tubing which tubing is continuously moving upward or downward thereby requiring a flexible hose with rotatable connections. The normal reinforced elastomeric hoses and braided metal hoses are not of sufficient strength to withstand the extreme pressures involved in the high-pressure drilling process. Such pressures may range from 8,000 PSI to 15,000 PSI, which exceeds the burst pressure for flexible hoses now available commercially. Thus, it has become necessary to use what is commonly termed "steel hose" which in actuality is a series of rigid steel tubes or pipes connected by swivel bearings. The pipes and swivel bearings have a sufficient burst strength to withstand the pressures experienced in high pressure drilling.

The burst strength is a result of the rigid pipe and heavy swivel connection. The flexibility is achieved through the use of relatively short sections of steel pipe joined with the swivel joints. The disadvantage inherent in this system of "steel hose" is that under the extreme pressures encountered in use of the hose, the longitudinal or axial forces established by the pressure within the hose tends to force apart the sections of the swivel joint and thereby introduces large friction forces in the swivel. As a practical matter this locks up the swivel joint and results in a rigid hose which defeats the intended purpose of the steel hose flexibility.

Attempts to prevent or reduce this frictional freezing up have involved the use of ball bearings or roller bearings in the swivel joints. While these have achieved some success, they do not remove the major portion of the stiffness of the steel hose when the bearings are new, and as corrosion and wear attack them, their effectiveness becomes even less.

Other attempts to solve the friction problem utilize swivel connections having a pressure-balanced design which in part offsets some of the friction forces incurred in the high pressure flow situations. Some of these devices are such as those disclosed in U.S. Pat. Nos. 3,454,288 and 2,421,691 which show spherical swivel joints having pressure-balanced features. The disadvantages of the spherical joints are that they must be large and bulky to accommodate the large spherical members and properly encase them, or they contain restricted flow passages through their interior. Any restriction at all or any projection into the normal flow diameter of the steel pipe would be subject to extremee erosion and corrosion effects from the high-pressure, high velocity abrasive or caustic fluid flow and would result in eary failure. The bulkiness of the joints makes the steel hose awkward, difficult to control by operators, and difficult to store when not in use.

Another problem encountered in the use of the spherical joints is the difficulty in accurately measuring the differential pressure area along the curving surface and radiused areas and thereby obtaining complete pressure balance.

Also, while the prior art devices may be substantially pressure-balanced longitudinally, they have no means for absorbing transverse forces or longitudinal forces arising from sources other than fluid pressure, such as tension when pulling on the hose, or compression from the weight of the hose when many sections are placed in vertical arrangement.

The present invention overcomes the disadvantages of the prior art by providing a pressure-balanced rotatable pipe connection which has a full diameter equal to that of the pipe, is compact and easy to manufacture, and contains bearing and packing means to enable the connection to easily rotate even under transverse lateral loadings and axial loadings induced by causes in addition to those from high pressure fluid. The connection is particularly useful where caustic fluids and/or fluids containing abrasives, such as sand, rock, or steel shot, are flowed through the connection.

DESCRIPTION OF THE PREFERRED EMBODIMENTS

Figure 1:
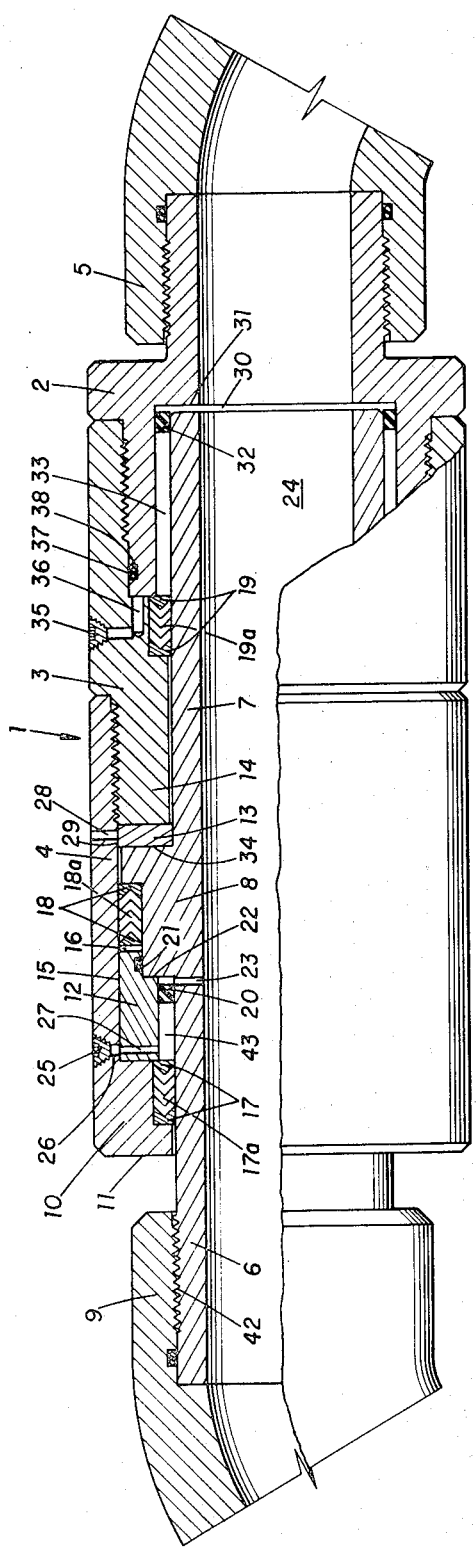
FIG. 1 is a view partly in cross-section showing the rotatable connection.

In FIG. 1 the rotatable connection 1 consists of a cylindrical base connector 2 to which is attached a cylindrical center section 3. A cylindrical external mandrel extension 4 is connected to the center section 3 by mating threads or other connecting means. Fixedly attached to the base connector 2 is a 90° ell 5. The parts 2, 3, and 4 comprise the primary rigid structure connected to the right hand section of steel hose by way of the 90° ell 5. Telescopically and slidably located concentrically within the right hand primary rigid structure is the secondary structure 6 comprising an interior mandrel 7 having an integral annular shoulder 8 permanently attached thereto. The secondary structure 6 can be attached to the left hand section of steel hose by way of 90° ell 9 or directly to the hose section itself (not shown) by any conventional means of attachment such as mating threads.

The secondary structure 6 is located within the primary structure in such a manner that the two structures can undergo unlimited rotational motion with respect to each other and can also undergo a slight longitudinal or axial movement with respect to each other.

Annular end cap 10 consists of shoulder 11 which is an integral part of mandrel extension 4. Extreme longitudinal movement between the primary and secondary structures is limited by bearing members 12 and 13. Bearing 12 is located between annular shoulder 8 and shoulder 11 and prevents extreme telescopic movement when the connection is subjected to tensile forces. Bearing 13 is located between annular shoulder 8 and inner shoulder 14 of center section 3. Bearings 12 and 13 are both circular rings encircling the interior mandrel 7. Bearing 13 can have a rectangular cross-sectional aqrea as can bearing 12. Bearing 12 is pictured as having an annular shoulder 15 extending into the annular recess 16 formed in annular shoulder 8. Annular shoulder 15 is capable of receiving transverse or lateral forces on the connection. Bearings 12 and 13 are preferably made of some fairly soft, non-galling metal or alloy such as bronze or cast iron, or can be any hard metal with a non-galling coating such as steel with a plastic lining. Also available for distributing lateral forces throughout the connection are lateral bearings 17, 18, and 19 made of material similar to that of bearings 12 and 13. The remainder of the connection parts are manufactured from a tough metal or alloy such as steel or stainless steel. Lateral bearings 17, 18 and 19 consist of two annular rings between which are located chevron packings 17A, 18A, and 19A. Lubricant is maintained in the recessed areas between bearings 17 and 18 around bearing 12 except for the area between rubber ring 20 and O-ring seal 21. Face 22 on integral shoulder 8 is exposed to the internal pressure flowing through the connection through bore passage 24 and into one or more ports 23. Rubber ring 20 and O-ring 21 maintain a pressure tight seal isolating the high pressure fluid from the main surfaces of the connection parts.

Plug 25 can be removed from channel 26 in order to inject more lubricant into the bearing area when the lubricant becomes dissipated through normal use. In place of plug 25, a grease fitting could be used which obviates the need for removing the plug each time lubricant is to be added. Channel 27 in bearing 12 allows lubricant to be passed into the innermost portion of the lubricant reservoir 43, even when the bearing is butted against shoulder 10 and face 12.

The differential pressure across annular shoulder 8 is developed by the high pressure fluid acting against shoulder 22. The pressure differential is insured by venting the low pressure side 34 of shoulder 8 to the atmosphere through one or more ports 28 in the wall of mandrel extension 4.

The atmospheric chamber 29 formed around bearing 13 behind face 34 also allows telescopic action of the parts without causing a vacuum or pressure lock. It also allows excess lubricant or high-pressure fluid leakage to exit the connection.

Gap 30 is formed between the end of mandrel 7 and an interior annular shoulder 31 of the base connector 2, and allows telescopic movement of the parts without hindrance. An elastomeric ring 32 is located in the lubricant recess 33 between the mandrel 7 and the base connector 2 and forms a fluid tight seal which prevents high-pressure fluid from entering the area between the telescoping parts.

A plug or fitting 35 located in lubricant channel 36 allows lubricant to be injected into recess 33 to maintain the proper level of lubricant there.

A seal 37 such as an O-ring seal is located in recess 38 in the base connector 2 and serves to prevent lubricant or fluid loss through the joint between base connector 2 and center section 3.

Figure 2:
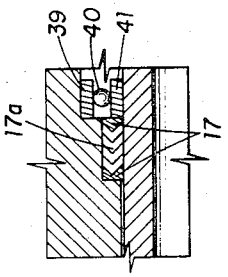
FIG. 2 is a view in cross-section showing an alternative transverse load bearing configuration.

FIG. 2 illustrates an alternate embodiment for lateral load bearings 17, 18, and 19. Rather than utilizing non-galling rings with chevron packings, the alternate bearing structure consists of a ball bearing or roller bearing having bearings 40 passing entirely around the circumference of the secondary structure 6, and riding on bearing surfaces comprising an inner race 41 and an outer race 39. Use of ball bearings instead of rings 17, 18, and 19 gives a greater life for the connection, easier operation, and ability to operate under greater lateral stesses.

Figure 7:
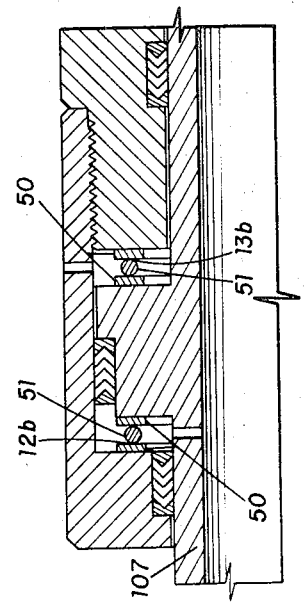
FIG. 7 is a cross-sectional view of the roller or ball bearings as alternate axial load bearing means to those of FIG. 1. de

FIG. 7 illustrates alternative bearing structures for the longitudinal load bearings 12 and 13. The bearing structures consist of axial ball bearing structures 12B and 13B comprising parallel annular races 50 mounted circumferentially around the mandrel 107 and containing a plurality of ball bearings 51 between the races. The bearing structures abut faces 153 and 122 and faces 134 and 154. Alternatively bearings 12B and 13B can be roller bearings rather than ball bearings.

Figure 3:
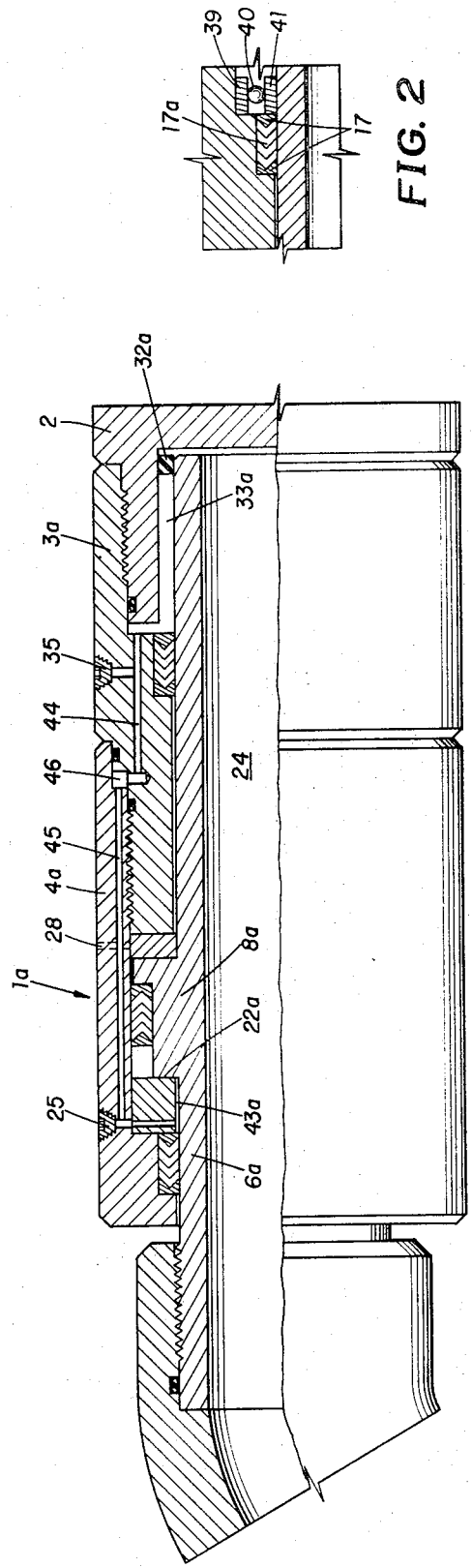
FIG. 3 is a view in cross-section showing an alternative embodiment of the bearing and packing area of the connection.

FIG. 3 shows an alternative design for that part of the primary structure composed of parts 3 and 4, the secondary structure 6 and bearing 12. The embodiment in FIG. 3 utilizes a diaphragm-type feature for applying the differential pressure to shoulder 8. In the drawing the secondary structure 6 of FIG. 1 is altered to provide a secondary structure 6A. This alteration consists of removing ports 23 and shortening the secondary structure between the threaded end 42 and shoulder 22. Thus, the connection of FIG. 3 comprises a cylindrical base connector 2 to which is attached a cylindrical center section 3A and the external mandrel extension 4A. As stated above, the rotatable connection 1A differs from its counterpart 1 in that it does not contain ports 23, elastomeric ring 20, reservoir 43, shoulder 15, nor seal 21. Also the secondary structure 6A is shorter than 6 because of the reduced length of the section from shoulder 22 to shoulder 10.

Since ports 23 are not present in structure 6A, a means of communicating the pressure of the fluid in bore 24 to the pressure differential area of shoulder 8A must be incorporated into the structure. This is accomplished by adding lubricant channels 44 and 45 to center section 3A and mandrel extension 4A respectively. Channels 44 and 45 are connected together by annular recess 46 formed between center A section 3A and mandrel extension 4A, and thereby provide fluid communication from recess 33A to the high pressure side of shoulder 8A at face 22A. The diaphragm effect is achieved by the elastomeric ring 32A transmitting fluidic pressure from the bore 24 to the recess 33A and thus into channels 44 and 45 to the face 22A. It should be emphasized that ports 28 do not intersect nor communicate with channel 45.

Both lubricant areas 33A and 43A can receive replacement lubricant simultaneously from one location by injecting the lubricant through either of the two injection fittings 25 or 35. Suitable lubricants include oil, water, grease, alcohol, hydraulic brake fluid, or ethylene glycol.

Figure 6:
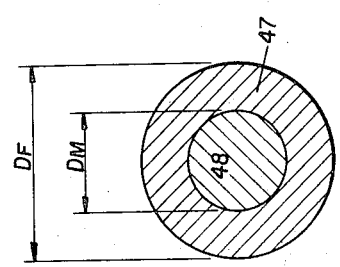
FIG. 6 is a cross-sectional view of the connection taken axially and showing the pressure differential areas.

In operation, the rotatable connection 1 of FIG. 1 flows high pressure fluid, which may be acidic, caustic or contain abrasive solids, through the bore passage 24. The high pressure fluid communicates through port 23 and against face 22 of shoulder 8 creating a pressure differential across shoulder 8. The pressure $P_S$ on face 22 is the same as the static pressure of the fluid in the bore while the pressure $P_A$ acting on face 34 of shoulder 8 is atmospheric pressure. The effective differential pressure area consists of face 22 which is an annular area. In order to be completely pressure-balanced, theoretically the area of face 22 must be equivalent to the cross-sectional area of interior mandrel 7. In FIG. 6 the differential pressure area $A_D$ is designated as 47 and this must be equal to the cross-section area $A_M$ of interior mandrel 7, designated as 48. The diameter of mandrel 7 is designated as $D_M$, while the diameter of face 22 is designated as $D_F$. The pressure force tending to drive the interior mandrel 7 out of the primary structure, parts 2, 3, and 4, is calculated by the formula $(P_S - P_A) \times (A_M)$. The presforce which acts upon face 22 and tends to push mandrel 7 back into the primary structure is calculated as $(P_S - P_A) (A_D)$. The differential pressure area is calculated by the relationship: $A_D = [\pi(D^2_F - D^2_M)] \div 4$. Therefore, the diameter relationship for a theoretically pressure-balanced connection is given by the formula: $D_F = \sqrt{2} \, D_M$.

Figure 4:
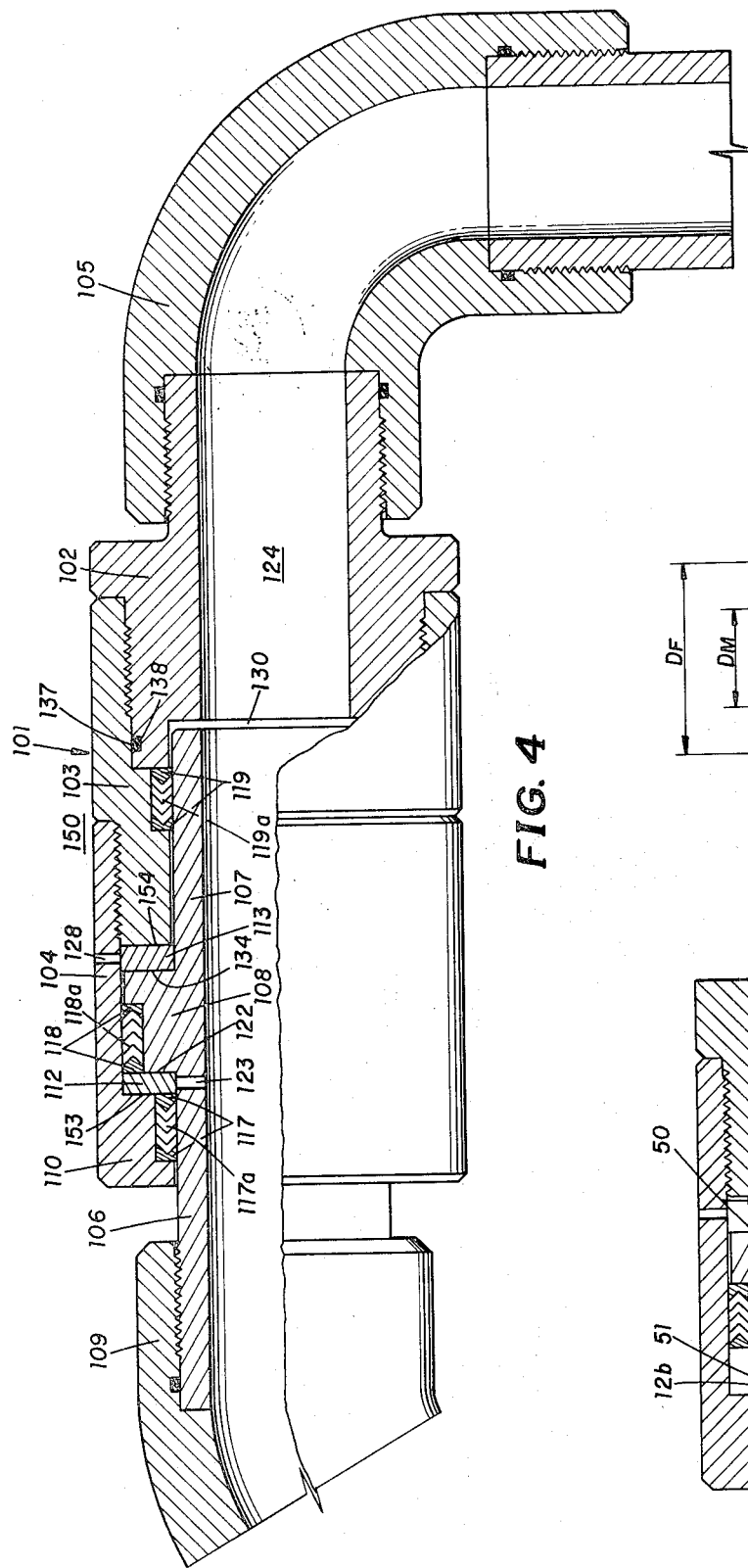
FIG. 4 is a view partly in cross-section of an alternate embodiment of the rotatable connection.

FIG. 4 illustrates an alternative embodiment of the rotatable connection particularly useful where non-corrosive, non-abrasive high pressure fluids are to be flowed through the connection. Since it does not have to offer protection from corrosive or erosive elements the connection A 101 of FIG. 4 is of a smaller and simpler design. Connection 101 comprises a cylindrical, outer, primary section 150 consisting of a base connector 102, a center section 103 connected to the base connector 102, and an external mandrel extension 104 connected to center section 103.

Located telescopically and concentrically within primary section 150 is secondary structure 106 which is a cylindrical tubular mandrel 107 having an annular shoulder 108 extending radially outward from it. The secondary structure 106 is mounted within the primary structure 150 so that each has the ability of unlimited rotation with respect to the other and each has a limited telescoping ability with respect to the other.

Mandrel extension 104 has an integral annular end cap 110 projecting radially inward toward interior mandrel 107. Secondary structure 106 may be connected to the steel hose (not shown) by a 90° ell 109 and base connector 102 may be connected to an opposing end of steel hose (also not shown) by a 90° ell 105. Located between the primary structure 150 and secondary structure 106 are three lateral support bearings 117, 118, and 119, and two axial support bearings 112 and 113. Packing means such as elastomeric chevron packing is located between the rings of bearing 117, 118, and 119 to provide a fluid tight seal around these bearings. All of the bearings 112, 113, 117, 118, and 119 are made of a non-galling metal or alloy or coated metal. The remainder of the rotatable connection is made of a tough metal or alloy such as steel or stainless steel.

Ports 123 communicate fluid pressure from central bore 124 to face 122 of shoulder 8. Fluid is prevented from exiting the area around bearing 112 by the packing elements 118.

The low pressure side 134 of annular shoulder 108 is vented to atmospheric pressure through one or more ports 128 in the wall of the external mandrel extension 104.

Bearing 112 absorbs longitudinal tension forces which may arise in the rotatable connection and bearing 113 absorbs longitudinal compressive forces which may arise.

The differential pressure area $A_D$ is the area of face 134 of shoulder 108 which area must equal the cross-sectional area of mandrel 107 in order for the connection to be pressure-balanced.

In order to allow unhindered rotational motion and pressure-balancing telescopic action of the secondary structure 106 in the primary structure 150, a gap 130 is left between base connector 102 and mandrel 107 and between base connector 102 and center section 103. Seal 137 located in recess 138 in base connector 102 prevents fluid loss through the joint between the base connector and center section 103. Bearing 119 with packing 119A prevents fluid leakage into the atmospheric pressure area around bearing 113.

Figure 5:
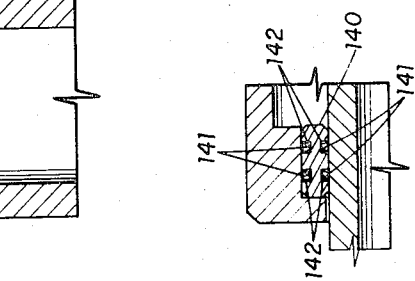
FIG. 5 is a cross-sectional view of an alternate bearing and seal arrangement for use in the rotatable connection.

FIG. 5 represents an alternative lateral bearing 140 which could be used to replace bearings 117, 118, and 119 and packings 117A, 118A, and 119A. The bearing is made of a non-galling material such as bronze and is substantially rectangular in shape with circular seals 141 located in recesses 142. Also the ball or roller bearings of FIG. 2 could be used in conjunction with bearings 140 or 117, 118, and 119.

Although specific preferred embodiments of the present invention have been described in detailed description above, the description is not intended to limit the invention to the particular forms or embodiments disclosed herein, since they are to be recognized as illustrative rather than restrictive and it will be obvious to those skilled in the art that the invention is not so limited. For example, the rotatable connection of this invention can be used in the high pressure handling of aqueous fluids, acids, caustics, petroleum products, mud, or cement, and any of these fluids can be clean or can contain abrasives such as sand, rock, quartz, glass beads, steel shot and others. The connection is advantageous in high pressure fluid use but is just as advantageous in low pressure use. The invention is declared to cover all changes and modifications of the specific example of this invention herein disclosed for purposes of illustration, which do not constitute departures from the spirit and scope of the invention.

What is claimed is:

1. A rotatable pipe connection for rotatably joining together two sections of rigid tubular pipe comprising:
   a. a cylindrical tubular primary section having an inner annular recessed portion and having port means through the wall communicating said recessed portion with the exterior of said connection;
   b. a cylindrical tubular secondary section located concentrically within said primary section and having an external annular shoulder projecting into the annular recessed portion of said primary section and having an internal bore passage and port means communicating said bore passage with said annular recessed portion of primary section; said secondary section arranged within said primary section so that telescopic movement of the two sections is possible;
c. first bearing means between said annular shoulder and said recessed portion for absorbing and distributing compressive longitudinal forces on said connection;
d. second bearing means between said shoulder and said recessed portion for absorbing and distributing longitudinal tension forces on said connection;
e. third bearing means between said secondary section and said primary section for absorbing lateral forces transverse to the longitudinal axis of said connection;
f. seal means between said port means in said primary section and said port means in said secondary section for preventing high pressure fluid loss from said rotatable connection, wherein said seal means further comprises chevron type packing material and said third bearing means comprises three circular bearing ring pairs with each pair of bearing rings having said chevron packing located between the rings, each of said bearing rings in said bearing ring pairs being a circular ring made of non-galling material;
g. first means for connecting said primary section to a pipe end;
h. second means for connecting said secondary section to a different pipe end; and
i. said annular shoulder arranged to receive fluidic pressure from said secondary section port means which fluidic pressure tends to counter normal high pressure forces within the connection which normal forces would otherwise tend to drive said secondary section out of said primary section.

2. The rotatable connection of claim 1 wherein said first and second connecting means comprises two 90° ells attached one each to said primary and secondary sections.

3. The rotatable connection of claim 2 wherein said primary section comprises:
a. a cylindrical base connector;
b. a cylindrical center section attached axially to said base connector; said center section having an internal annular recess; and
c. an external cylindrical mandrel extension attached to said center section and having an annular interior recess portion and an annular end cap, said end cap having an annular recessed portion also; said mandrel extension having port means through the wall for communicating said internal annular recess in said extension to the exterior of said extension.

4. The rotatable connection of claim 3 wherein said secondary section comprises a tubular cylindrical interior mandrel having an annular shoulder extending radially outward arranged to fit within said internal annular recess in said cylindrical center section; said mandrel having an internal bore passage and port means through the wall communicating said bore passage with said internal annular recess in said center section; and said annular shoulder having a recessed portion in its outer circumference.

5. The rotatable connection of claim 4 wherein said first and second bearing means comprise circular bearings having substantially rectangular cross-section and made of non-galling material.

6. The rotatable connection of claim 5 wherein said third bearing means further comprises three circular bearing ring pairs and wherein the first of said ring pairs is located in said annular end cap adjacent to and touching said end cap and said interior mandrel, said second of said ring pairs is located in said recess in said annular shoulder adjacent to and touching said annular shoulder and the wall of said recess in said external mandrel extension; and said third of said bearing ring pairs is located within said annular recess in said cylindrical center section adjacent to and touching said center section and said interior mandrel.

7. The rotatable connection of claim 6 wherein said third bearing means further comprises in addition to said three bearing ring pairs, radial ball bearing means adapted to receive and transmit forces normal to the longitudinal axis of said rotatable connection and further adapted to withstand unlimited rotation of said primary section with respect to said secondary section and vice versa.

8. The rotatable connection of claim 6 wherein said third bearing means further comprises in addition to said three bearing ring pairs, radial roller bearing means adapted to receive and transmit forces normal to the longitudinal axis of said rotatable connection and further adapted to withstand unlimited rotation between said primary section and said secondary section.

9. A rotatable pipe connection for rotatably joining together two sections of rigid tubular pipe comprising:
a. a cylindrical tubular primary section having an inner annular recessed portion and having port means through the wall communicating said recessed portion with the exterior of said connection;
b. a cylindrical tubular secondary section located concentrically within said primary section and having an external annular shoulder projecting into the annular recessed portion of said primary section and having an internal bore passage and port means communicating said bore passage with said annular recessed portion of primary section; said secondary section arranged within said primary section so that telescopic movement of the two sections is possible;
c. first bearing means between said annular shoulder and said recessed portion for absorbing and distributing compressive longitudinal forces on said connection;
d. second bearing means between said shoulder and said recessed portion for absorbing and distributing longitudinal tension forces on said connection;
e. third bearing means between said secondary section and said primary section for absorbing lateral forces transverse to the longitudinal axis of said connection; wherein said third bearing means comprises three annular rings having substantially rectangular cross-section area, each said ring being of a non-galling material and having one or more annular recesses in the top and bottom surfaces thereof, with elastomeric seal means located in said recesses arranged to substantially fill up the interior area of said recesses and extend outward into sealing engagement with the surfaces next adjacent to said third bearing means;
f. seal means between said port means in said primary section and said port means in said secondary section for preventing high pressure fluid loss from said rotatable connection;

g. first means for connecting said primary section to a pipe end;

h. second means for connecting said secondary section to a different pipe end; and i. said annular shoulder arranged to receive fluidic pressure from said secondary section port means which fluidic pressure tends to counter normal high pressure forces within the connection which normal forces would otherwise tend to drive said secondary section out of said primary section.

10. The rotatable connection of claim 4 wherein said first and second bearing means comprise axial ball bearings with load-bearing races mounted parallel circumferentially on said interior mandrel section between said annular shoulder and said annular recess in said external mandrel extension and adapted to receive and transmit longitudinal axial forces on said rotatable connection while allowing unlimited rotational movement between said primary section and said secondary section.

11. The rotatable connection of claim 2 wherein said annular shoulder has a high pressure face exposed to said ports in said secondary section, and a low pressure face exposed to said ports in said primary section and said high pressure face is arranged to allow high pressure fluid in said bore portion of said secondary section to counter high pressure fluid forces tending to drive said secondary section out of said primary section, and said high pressure face comprises an annular area substantially equivalent to the cross-sectional area of said inner mandrel.

12. A rotatable connection for joining two tubular sections is rotatable relationship for use in conveying high pressure fluids containing caustic, acidic elements and high pressure fluids containing abrasive solids, said connection adapted for pressure balanced rotatable operation, comprising:

a. a cylindrical tubular primary section;

b. a cylindrical tubular internal mandrel located telescopically within said primary section and adapted to rotate freely within said primary section;

c. pressure balancing means located in said connection and adapted for countering the usual longitudinal forces exerted on said connection arising from high pressures within said connection;

d. bearing means to absorb and transmit all forces applied to said connection in addition to high pressure forces, said bearing means being disposed between said primary section and said internal mandrel;

e. means for providing lubrication to said bearing means; and f. seal means located between said inner mandrel, said annular shoulder and said primary structure and arranged to prevent high pressure fluid loss out of said mandrel and annular recess and for preventing contamination of said lubricating means.

13. The rotatable connection of claim 12 further comprising diaphragm means for communicating fluid pressure forces from said inner mandrel to said pressure balancing means, and substantially incompressible fluid between said diaphragm means and said pressure balancing means.

14. The rotatable connection of claim 13 wherein said diaphragm means further comprises an elastomeric sealing means placed between said inner mandrel and said primary structure; a lubricant reservoir located at said pressure balancing means and fluidly communicating with said pressure balancing means; lubricant channels providing fluid communication from said elastomeric sealing means to said lubricant reservoir; and sufficient lubricant in said channels to provide fluid communication from said elastomeric sealing means to said reservoir.

15. The rotatable connection of claim 14 wherein said diaphragm means further comprises externally accessible port means located in said lubricant channels and adapted to allow additional lubricant to be injected into said diaphragm means, with plug means in said externally accessible port means for sealing off said port means when additional lubricant is not be added.

16. The rotatable connection of claim 15 wherein said plug means comprises threaded cylindrical plugs inserted into said port means to seal off said port means against lubricant leakage, said cylindrical plugs being adapted for easy removal when desired.

17. The rotatable connection of claim 15 wherein said plug means comprises threaded check-valve type greast fittings adapted to seal off said port means against lubricant leakage, said fittings also adapted to allow lubricant to be injected therethrough and prevent lubricant from flowing back out.

18. The rotatable connection of claim 12 wherein said primary section further comprises:

a. a cylindrical base connector;

b. a cylindrical center section connected to said base connector; and c. an external mandrel extension connected to said center section and having an inner annular recess and an annular cap end, said mandrel extension having lubricant supply means within the wall and having atmospheric vent port means passing through the wall and communicating said pressure balancing means with the atmosphere.

19. The rotatable connection of claim 17 wherein said pressure balancing means is integrally attached to said mandrel, and said pressure balancing means further comprises:

a. an annular shoulder on said inner mandrel extending radially outward from said mandrel into said annular recess in said external mandrel extension;

b. seal means between said annular shoulder and said inner recess in said external mandrel extension fluidically sealing one side of said shoulder from the other side of said shoulder;

c. port means through said internal mandrel for communicating fluid pressure from said internal mandrel inner bore to one face of said annular shoulder; and d. port means through said external mandrel extension near said annular shoulder for providing communicating of said other side of said shoulder with atmospheric pressure.

* * * * *